United States Patent
Bilgen et al.

(10) Patent No.: US 11,420,429 B2
(45) Date of Patent: Aug. 23, 2022

(54) MULTILAYER CAST FILMS AND METHODS OF MAKING THEREOF

(71) Applicant: Dow Global Technologies LLC, Midland, MI (US)

(72) Inventors: Mustafa Bilgen, Freeport, TX (US); Teresa P. Karjala, Lake Jackson, TX (US); Jon W. Hobson, Lake Jackson, TX (US); Hrishikesh R. Munj, Freeport, TX (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 52 days.

(21) Appl. No.: 16/759,912

(22) PCT Filed: Dec. 17, 2018

(86) PCT No.: PCT/US2018/065923
§ 371 (c)(1),
(2) Date: Apr. 28, 2020

(87) PCT Pub. No.: WO2019/125989
PCT Pub. Date: Jun. 27, 2019

(65) Prior Publication Data
US 2021/0178735 A1 Jun. 17, 2021

Related U.S. Application Data

(60) Provisional application No. 62/608,079, filed on Dec. 20, 2017.

(51) Int. Cl.
| | |
|---|---|
| *B32B 7/02* | (2019.01) |
| *B32B 27/08* | (2006.01) |
| *B32B 27/32* | (2006.01) |
| *C08L 23/06* | (2006.01) |
| *C08L 23/08* | (2006.01) |

(52) U.S. Cl.
CPC ............ *B32B 27/08* (2013.01); *B32B 27/327* (2013.01); *C08L 23/06* (2013.01); *C08L 23/0815* (2013.01); *B32B 2250/03* (2013.01); *B32B 2250/242* (2013.01); *B32B 2270/00* (2013.01); *B32B 2307/72* (2013.01); *B32B 2439/00* (2013.01); *C08L 2205/025* (2013.01)

(58) Field of Classification Search
CPC .................................................... B32B 27/327
See application file for complete search history.

(56) References Cited

U.S. PATENT DOCUMENTS

| | | | |
|---|---|---|---|
| 9,255,160 B2 | 2/2016 | Desjardins et al. | |
| 2011/0311792 A1 | 12/2011 | Batra et al. | |
| 2014/0248480 A1* | 9/2014 | Vinck | B65D 65/40 428/218 |
| 2014/0272443 A1* | 9/2014 | Kinnan | B65D 19/44 428/516 |

FOREIGN PATENT DOCUMENTS

| | | |
|---|---|---|
| WO | 2015/119845 A1 | 8/2015 |
| WO | 2015/120401 A1 | 8/2015 |
| WO | 2015/200742 A1 | 12/2015 |
| WO | 2017/039987 A1 | 3/2017 |
| WO | 2017/139096 A1 | 8/2017 |
| WO | 2018/063694 A1 | 4/2018 |

OTHER PUBLICATIONS

PCT/US2018/065923, International Search Report and Written Opinion dated Feb. 28, 2019.
PCT/US2018/065923, International Preliminary Report on Patentability dated Jul. 2, 2020.

* cited by examiner

*Primary Examiner* — Zachary M Davis

(57) ABSTRACT

Embodiments disclosed herein include multilayer cast films having a cling layer and a release layer, wherein the cling layer comprises (i) a first polyethylene composition, and (ii) ultra-low density polyethylene, very low density polyethylene, ethylene/alpha-olefin elastomer, propylene-based elastomer, or combinations thereof; and the release layer comprises a second polyethylene composition.

7 Claims, No Drawings

MULTILAYER CAST FILMS AND METHODS OF MAKING THEREOF

TECHNICAL FIELD

Embodiments of the present disclosure generally relate to multilayer cast films, and more particularly, to multilayer cast films having enhanced melt flow properties.

BACKGROUND

Multilayer stretch cast films are often used in packaging, and may package diverse items, such as, bulk farm materials like grass and hay to small grocery store items like meats and vegetables. Currently, there is a growing trend in the marketplace towards the use of high performance stretch films for unitization purposes, ensuring higher unit load stability, integrity, and safety. These high performance stretch films are often manufactured on cast film lines that use wide dies. However, the use of wide dies leads to poor web stability and gauge variability in the films, as well as, sub-optimal film properties believed to be due, in part, to the use of resins having poor melt flow properties.

Accordingly, alternative multilayer cast films may be desired to be formed from resins having improved melt flow properties, which also maintain a desired film toughness and film optics.

SUMMARY

Disclosed in embodiments herein are multilayer cast films. The multilayer cast films have a cling layer and a release layer, wherein the cling layer comprises: (i) a first polyethylene composition which comprises the reaction product of ethylene and, optionally, one or more alpha olefin comonomers, wherein the first polyethylene composition is characterized by the following properties: (a) a melt index, $I_2$, of greater than 5.0 to 12.0 g/10 min; (b) a density of 0.905 to 0.920 g/cc; (c) a melt flow ratio, $I_{10}/I_2$, of 6.0 to 7.6; and (d) a molecular weight distribution, (Mw/Mn) of from 2.6 to 3.5 and (ii) a polymer selected from ultra-low density polyethylene, very low density polyethylene, ethylene/alpha-olefin elastomer, propylene-based elastomer, or combinations thereof; and the release layer comprises a second polyethylene composition which comprises the reaction product of ethylene and, optionally, one or more alpha olefin comonomers, wherein the second polyethylene composition is characterized by the following properties: (a) a melt index, $I_2$, of greater than 5.0 to 12.0 g/10 min; (b) a density of 0.905 to 0.920 g/cc; (c) a melt flow ratio, $I_{10}/I_2$, of 6.0 to 7.6; and (d) a molecular weight distribution, (Mw/Mn) of from 2.6 to 4.0.

Additional features and advantages of the embodiments will be set forth in the detailed description which follows, and in part will be readily apparent to those skilled in the art from that description or recognized by practicing the embodiments described herein, including the detailed description which follows the claims. It is to be understood that both the foregoing and the following description describe various embodiments and are intended to provide an overview or framework for understanding the nature and character of the claimed subject matter.

DETAILED DESCRIPTION

Reference will now be made in detail to embodiments of multilayer cast films and materials used to make such films. The multilayer cast films may be used in stretch-cling applications. It is noted, however, that this is merely an illustrative implementation of the embodiments disclosed herein. The embodiments are applicable to other technologies that are susceptible to similar problems as those discussed above. For example, the multilayer cast films described herein may be used as surface protection films, agricultural films, such as silage wrap, or in other flexible packaging applications, such as, shrink films, heavy duty shipping sacks, liners, sacks, stand-up pouches, detergent pouches, sachets, etc., all of which are within the purview of the present embodiments.

In embodiments described herein, the multilayer cast films comprise a cling layer and a release layer. Optionally, one or more core layers may be positioned between the cling layer and the release layer. The cling layer is an outer layer of the multilayer cast film that has a sufficient level of adhesive tack such that the cling layer of the multilayer cast film may form a releasable bond when brought into contact with a surface, such as, the surface of an article or the surface of the release layer. The release layer is an outer layer of the multilayer cast film that exhibits low adhesion to the cling layer. The release layer can allow for separation to occur between the cling layer/release layer interface on a roll such that the multilayer cast film may be unrolled from a spool without undue force or without the film tearing.

The thickness of the cling and release layers can vary over a wide range. In some embodiments, the cling layer may have a thickness that is from 5-50 percent of the overall thickness of the film, from 5-30 percent of the overall thickness of the film, or even from 10-30 percent of the overall thickness of the film. The release layer may have a thickness that is from 5-50 percent of the overall thickness of the film, from 5-30 percent of the overall thickness of the film, or even from 10-30 percent of the overall thickness of the film. In some embodiments, where one or more core layers are present, the one or more core layers may have a thickness that is from 0-90 percent of the overall thickness of the film, 10-90 percent of the overall thickness of the film, 20-90 percent of the overall thickness of the film, 30-90 percent of the overall thickness of the film, 40-90 percent of the overall thickness of the film, or 40-80 percent of the overall thickness of the film. The ratio of the thicknesses among a cling layer, a release layer, and any optional core layers can be any ratio that provides desirable properties such as cling, release, and the like. In some embodiments, a multilayer cast film can have a cling layer thickness, a core layer thickness, and a release layer thickness in a ratio in the range of 1:8:1 to 3:4:3.

Cling Layer

The cling layer may comprise a first polyethylene composition and a polymer selected from ultra-low density polyethylene ("ULDPE"), a very low density polyethylene ("VLDPE"), ethylene/alpha-olefin elastomer, propylene-based elastomer, or combinations thereof. In some embodiments, the cling layer comprises a first polyethylene composition and a propylene-based elastomer. In other embodiments, the cling layer comprises a first polyethylene composition and an ultra-low density polyethylene. In further embodiments, the cling layer comprises a first polyethylene composition and a very low density polyethylene. In even further embodiments, the cling layer comprises a first polyethylene composition and an ethylene/alpha-olefin elastomer. In even further embodiments, the cling layer comprises a first polyethylene composition and two or more of a propylene-based elastomer, an ultra-low density polyethylene, a very low density polyethylene, or an ethylene/alpha-olefin elastomer.

In embodiments herein, the cling layer comprises from 50 wt. % to 99 wt. % of the first polyethylene composition. All individual values and subranges of from 50 wt. % to 99 wt. % are included and disclosed herein. For example, in some embodiments, the cling layer comprises from 65 wt. % to 98 wt. %, 70 wt. % to 98 wt. %, or 75 wt. % to 98 wt. %, by weight of the cling layer, of the first polyethylene composition.

In embodiments herein, the cling layer comprises from 2 wt. % to 50 wt. % of the polymer selected from ultra-low density polyethylene, a very low density polyethylene, ethylene/alpha-olefin elastomer, propylene-based elastomer, or combinations thereof. All individual values and subranges of from 5 wt. % to 50 wt. % are included and disclosed herein. For example, in some embodiments, the cling layer comprises from 2 wt. % to 40 wt. %, 2 wt. % to 30 wt. %, or 2 wt. % to 25 wt. %, by weight of the cling layer, of the polymer.

Release Layer

The release layer comprises a second polyethylene composition. In embodiments herein, the release layer comprises from 60 wt. % to 100 wt. % of the second polyethylene composition. All individual values and subranges of from 60 wt. % to 100 wt. % are included and disclosed herein. For example, in some embodiments, the release layer comprises from 65 wt. % to 100 wt. %, 70 wt. % to 100 wt. %, or 75 wt. % to 100 wt. %, by weight of the release layer, of the second polyethylene composition.

The release layer may further comprise an optional low density polyethylene (LDPE). In embodiments herein, the release layer comprises 0 wt. % to 40 wt. % of the LDPE. All individual values and subranges of from 0 wt. % to 40 wt. % are included and disclosed herein. For example, in some embodiments, the release layer comprises from 0 wt. % to 35 wt. %, 0 wt. % to 30 wt. %, or 0 wt. % to 25 wt. %, by weight of the release layer, of the LDPE. The LDPE may have a density in the range of 0.910 to 0.930 grams/cc and a melt index in the range of 0.5 to 4.0 grams/10 minutes.

Core Layer

Optionally, a multilayer cast film described herein can include one or more core layers positioned between the cling layer and the release layer. In some embodiments, the multilayer cast film comprises a core layer positioned between the cling layer and the release layer. In other embodiments, the multilayer cast film comprises a single core layer positioned between and contacting at least a portion of the cling layer and the release layer.

The core layer can include one or more of LLDPE (linear low density polyethylene), LDPE (low density polyethylene), ethylene/alpha-olefin elastomer, polypropylene elastomer, and/or ethylene vinyl acetate (EVA). In some embodiments, the core layer comprises LLDPE in an amount from 25 to 100 percent, 30 to 100 percent, 40 to 100 percent, 50 to 100 percent, 60 to 100 percent, 65 to 100 percent, 70 to 100 percent, 75 to 100 percent, by weight of the core layer. In other embodiments, the core layer comprises LLDPE and one or more of ethylene/alpha-olefin elastomer, polypropylene elastomer, or ethylene vinyl acetate. The one or more of ethylene/alpha-olefin elastomer, polypropylene elastomer, or ethylene vinyl acetate may be present in amounts ranging from 1 to 30 percent, 1 to 25 percent, 1 to 20 percent, or 1 to 15 percent, by weight, of the core layer. In further embodiments, the core layer may comprise LLDPE and LDPE. The LDPE may be present in amounts ranging from 1 to 50 percent, 1 to 35 percent, 1 to 25 percent, or 1 to 20 percent, by weight, of the core layer. Exemplary LLDPE for use in the core layer of a multilayer cast film is commercially available under the trade names ELITE™, TUFLIN™, and DOWLEX™ from the Dow Chemical Company.

The cling layer, the release layer, and the optional one or more core layers may further include one or more additives. Nonlimiting examples of suitable additives include antioxidants, pigments, colorants, UV stabilizers, UV absorbers, curing agents, cross linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from less than about 0.01 wt. % to more than about 10 wt. % based on the weight of the composition in each layer.

First and Second Polyethylene Compositions

The first and second polyethylene compositions comprise the reaction product of ethylene and, optionally, one or more alpha olefin comonomers. The first and second polyethylene compositions comprise greater than 50 wt. % of the units derived from ethylene and less than 30 wt. % of the units derived from one or more alpha-olefin comonomers. In some embodiments, the first and second polyethylene compositions comprise (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5%, from 90% to 99%, from 90% to 97%, from 90% to 95%, from 93% to 99.9%, from 93% to 99.5% from 93% to 99%, or from 93% to 97%, by weight, of the units derived from ethylene; and (b) optionally, less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more α-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. The one or more alpha-olefins may be selected from the group consisting of C3-C20 acetylenically unsaturated monomers and C4-C18 diolefins. Those skilled in the art will understand that the selected monomers are desirably those that do not destroy conventional Ziegler-Natta catalysts. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene. In some embodiments, the first and second polyethylene compositions comprise greater than 0 wt. % and less than 30 wt. % of units derived from one or more of octene, hexene, or butene comonomers.

In some embodiments, the first and second polyethylene compositions are formed in the presence of a catalyst composition comprising a multi-metallic procatalyst via solution polymerization. The multi-metallic procatalyst used in producing the reaction product is at least trimetallic, but may also include more than three transition metals, and thus may in one embodiment be defined more comprehensively as multi-metallic. These three, or more, transition metals are selected prior to production of the catalyst. In a particular embodiment, the multi-metal catalyst comprises titanium as one element.

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.25 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., alternatively, 0° C. to 50° C.; a time ranging from 1 to 12 hours, alternatively, from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. The conditioning compound has a molar ratio constitution that is specific and which is believed to be an important feature in ensuring the desirable catalyst performance Specifically, the procatalyst desirably exhibits a molar ratio of the magnesium to the conditioning compound that ranges from 3:1 to 6:1. Without wishing to be bound by any theory of mechanism, it is suggested that this aging serves to facilitate or enhance adsorption of additional metals onto the support.

Once the conditioned support is prepared and suitably aged, it is brought into contact with a titanium compound which may be added individually or as a mixture with the "second metal". In certain preferred embodiments titanium halides or alkoxides, or combinations thereof, may be selected. Conditions may include a temperature within the range from 0° C. to 50° C., alternatively from 25° C. to 35° C.; a time from 3 hours to 24 hours, alternatively from 6 hours to 12 hours; or both. The result of this step is adsorption of at least a portion of the titanium compound onto the conditioned magnesium halide support.

Finally, one or two additional metals, referred to herein as "the second metal" and "the third metal" for convenience, will also be adsorbed onto the magnesium-based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

In embodiments described herein, the first and second polyethylene compositions may have a metal catalyst residual of greater than or equal to 1 parts by combined weight of at least three metal residues per one million parts of polyethylene composition, wherein the at least three metal residues are selected from the group consisting of titanium, zirconium, hafnium, vanadium, niobium, tantalum, chromium, molybdenum, tungsten, and combinations thereof, and wherein each of the at least three metal residues is present at greater than or equal to 0.2 ppm, for example, in the range of from 0.2 to 5 ppm. All individual values and subranges from greater than or equal to 0.2 ppm are included herein and disclosed herein; for example, the first and second polyethylene compositions may further comprise greater than or equal to 2 parts by combined weight of at least three metal residues remaining from the multi-metallic polymerization catalyst per one million parts of the polyethylene composition.

In some embodiments, the first and second polyethylene compositions comprise at least 0.50 ppm of V (Vanadium). All individual values and subranges from at least 0.50 ppm of V are included and disclosed herein; for example the lower limit of the V in the polyethylene composition may be 0.50, 0.55, 0.60, 0.75, 1, 1.1, 1.2, 1.3 or 1.4 ppm to an upper limit of the V in the polyethylene composition may be 5, 4, 3, 2.5, 2, 1.9, 1.8, 1.7, 1.6, 1.5, or 1 ppm. The vanadium catalyst metal residual concentration for the first and second polyethylene compositions can be measured using the Neutron Activation Method for Metals described below.

In some embodiments, the first and second polyethylene compositions comprise at least 0.3 ppm of Zr (Zirconium). All individual values and subranges of at least 0.3 ppm of Zr are included and disclosed herein; for example the lower limit of the Zr in the polyethylene composition may be 0.3, 0.4, 0.5, 0.6 or 0.7 ppm. In yet another embodiment, the upper limit of the Zr in the polyethylene composition may be 5, 4, 3, 2, 1, 0.9, 0.8 or 0.7 ppm. The zirconium catalyst metal residual concentration for the first and second polyethylene compositions can be measured using the Neutron Activation Method for Metals described below.

In embodiments described herein, the first and second polyethylene compositions have a density of 0.905 g/cc to 0.920 g/cc. All individual values and subranges of at least 0.905 g/cc to 0.920 g/cc are included and disclosed herein. For example, in some embodiments, the first and/or second polyethylene compositions have a density of 0.907 to 0.920 g/cc, 0.910 to 0.920 g/cc, 0.910 to 0.918 g/cc, or 0.912 to 0.918 g/cc. Density may be measured in accordance with ASTM D792.

In addition to the density, the first and second polyethylene compositions have a melt index, I2, of greater than 5.0 g/10 min to 12.0 g/10 min. All individual values and subranges of greater than 5.0 g/10 min to 12.0 g/10 min are included and disclosed herein. For example, in some embodiments, the first and/or second polyethylene compositions may have melt index, $I_2$, ranging from a lower limit of 5.1, 5.2, 5.5, 6.0, 6.5, 6.8, or 7.0 to an upper limit of 12.0, 10.0, 8.0, 7.5, 7.0, 6.5, 6.0, or 5.5 g/10 min. In other embodiments, the first and/or second polyethylene compositions may have a melt index, I2, of greater than 5.0 g/10 min to 10.0 g/10 min, 5.2 g/10 min to 10.0 g/10 min, or 5.2 g/10 min to 9.0 g/10 min. Melt index, I2, may be measured in accordance with ASTM D1238-13 (190° C. and 2.16 kg).

In addition to the density and melt index (I2), the first and second polyethylene compositions have a melt flow ratio, I10/I2, of 6.0 to 7.6. All individual values and subranges of 6.0 to 7.6 are included and disclosed herein. For example, in some embodiments, the first and/or second polyethylene compositions may have a melt flow ratio, I10/I2, of 6.0 to 7.5, 6.2 to 7.5, 6.5 to 7.5, 6.5 to 7.4, or, 6.5 to 7.3. In other embodiments, the first and/or second polyethylene compositions may have a melt flow ratio, I10/I2, of from 6.2 to 7.5, 6.3 to 7.4, 6.4 to 7.3, or 6.5 to 7.2. Melt index, I10, may be measured in accordance with ASTM D1238 (190° C. and 10.0 kg).

In addition to the density, melt index (I2), and melt flow ratio (I10/I2), the first polyethylene composition has a molecular weight distribution (Mw/Mn) of from 2.6 to 3.5 and the second polyethylene composition has a molecular weight distribution (Mw/Mn) of from 2.6 to 4.0. All individual values and subranges are included and disclosed herein. For example, the first polyethylene composition may have an Mw/Mn ratio from a lower limit of 2.6, 2.7, 2.9, or 3.0 to an upper limit of 3.5, 3.4, or 3.3 and/or the second polyethylene composition may have an Mw/Mn ratio from a lower limit of 2.6, 2.7, 2.9, or 3.0 to an upper limit of 4.0, 3.8, 3.5, 3.4, or 3.2. In some embodiments, the first polyethylene composition may have an Mw/Mn ratio of from 2.6 to 3.4, 2.7 to 3.4, or 2.8 to 3.3 and/or the second polyethylene composition may have an Mw/Mn ratio of from 2.7 to 3.9, 2.8 to 3.9, or 2.8 to 3.7. In other embodiments, the first and/or second polyethylene compositions may have an Mw/Mn ratio of from 2.7 to 3.5 or 2.8 to 3.4. Molecular weight distribution can be described as the ratio of weight average molecular weight ($M_w$) to number average molecular weight ($M_n$) $M_w/M_n$), and can be measured by gel permeation chromatography techniques.

In addition to the density, melt index (I2), melt flow ratio (I10/I2), and molecular weight distribution, the first and/or second polyethylene compositions may have a viscosity at 0.1 rad/s and 190° C. of 1,000 Pa·s to 2,000 Pa·s. All individual values and subranges of 1,000 Pa·s to 2,000 Pa·s are included and disclosed herein. For example, in some embodiments, the first and/or second polyethylene compositions may have a viscosity at 0.1 rad/s and 190° C. of 1,000 Pa·s to 2,000 Pa·s or 1,100 Pa·s to 1,650 Pa·s.

In addition to the density, melt index (I2), melt flow ratio (I10/I2), molecular weight distribution, and the viscosity at 0.1 rad/s and 190° C., the first and/or second polyethylene compositions may have a viscosity ratio (V0.1/V100) of 1.5 to 2.2, wherein V0.1 is the viscosity at 0.1 rad/s and 190° C., and V100 is the viscosity at 100 rad/s and 190° C. All individual values and subranges of 1.5 to 2.2 are included and disclosed herein. For example, in some embodiments, the first and/or second polyethylene compositions may have a viscosity ratio of 1.7 to 2.2. In other embodiments, the first and/or second polyethylene compositions may have a viscosity ratio of 1.5 to 2.1 or 1.8 to 2.1.

In addition to the density, melt index (I2), melt flow ratio (I10/I2), molecular weight distribution, the viscosity at 0.1 rad/s and 190° C., and the viscosity ratio (V0.1/V100), the first and/or second polyethylene compositions may have a tan delta at 0.1 rad/s (190° C.) of 45 to 150. All individual values and subranges of 45 to 150 are included and disclosed herein. For example, in some embodiments, the first and/or second polyethylene compositions may have a tan delta at 0.1 rad/s (190° C.) of 45 to 100, 50 to 100, or 50 to 85.

In addition to the density, melt index (I2), melt flow ratio (I10/I2), molecular weight distribution, the viscosity at 0.1 rad/s and 190° C., the viscosity ratio (V0.1/V100), and the tan delta, the first and/or second polyethylene compositions may have a composition distribution breadth index, CDBI, of 40% to 60%. All individual values and subranges of 40% to 60% are included and disclosed herein. For example, in some embodiments, the first and/or second polyethylene compositions may have a CDBI of 40% to 58%, 40% to 55%, or 45% to 55%.

CDBI may be defined as the weight percent of the polymer molecules having a comonomer content within 50 percent of the median total molar comonomer content. The CDBI of linear polyethylene, which does not contain a comonomer, is defined to be 100%. The CDBI of a copolymer is readily calculated from data obtained from crystallization elution fractionation ("CEF") as described below. Unless otherwise indicated, terms such as "comonomer content", "average comonomer content" and the like refer to the bulk comonomer content of the indicated interpolymer blend, blend component, or fraction on a molar basis.

In embodiments described herein, the first polyethylene composition may be the same or different from the second polyethylene composition in one or more of the following properties: melt index (I2), melt flow ratio (I10/I2), density, Mw/Mn, viscosity at 0.1 rad/s, viscosity ratio (V0.1/V100), or CDBI, as previously described herein.

Polymer

As noted above, the cling layer comprises a polymer selected from ULDPE (ultra-low density polyethylene), VLDPE (very low density polyethylene), ethylene/alpha-olefin elastomer, propylene-based elastomer, or combinations thereof. The polymer can be incorporated into the cling layer in an amount based on a variety of factors, such as, the amounts of other ingredients (e.g., the first polyethylene composition) present in the cling layer, desired tack/cling properties in the film; cost; tack stability during manufacturing, transportation, storage, and/or use conditions. In some embodiments, the polymer is present in the cling layer in an amount in the range of 1 percent to 50 percent by weight of the cling layer, in the range of 2 to 40 percent by weight of the cling layer, in the range of 2 to 30 percent by weight of the cling layer, or even in the range of 2 to 15 percent by weight of the cling layer.

ULDPE or VLDPE comprises, in polymerized form, a majority weight percent of units derived from ethylene, based on the total weight of the ULDPE or VLDPE. The ULDPE or VLDPE may be an interpolymer of ethylene and at least one ethylenically unsaturated comonomer. In some embodiments, the comonomer is a C3-C20 alpha-olefin. In other embodiments, the comonomer is a C3-C8 alpha-olefin. In further embodiments, the C3-C8 alpha-olefin is selected from propylene, 1-butene, 1-hexene, or 1-octene. In even further embodiments, the ULDPE or VLDPE may be an ethylene/propylene copolymer, ethylene/butene copolymer, ethylene/hexene copolymer, or ethylene/octene copolymer.

ULDPE or VLDPE can be made using Ziegler-Natta catalyst techniques to provide a desired level of purge fraction. Ziegler-Natta catalysts are described in U.S. Publication Numbers 2008/0038571 (Klitzmiller et al.) and 2008/0176981 (Biscoglio et al.), the entirety of which publications are incorporated herein by reference. In some embodiments, Ziegler-Natta catalyzed ULDPE or VLDPE includes a copolymer of ethylene and 3.5 to 10.5 mole percent of at least one comonomer selected from the group consisting of $C_3$-$C_{20}$ α-olefins, dienes, and cycloalkenes. "ULDPE" and "VLDPE" can be used interchangeably. See, e.g., U.S. Publication Number 2008/0038571 (Klitzmiller et al.), the entirety of which is incorporated herein by reference. In some embodiments, VLDPE refers to ULDPEs or VLDPEs that are manufactured by gas phase reaction techniques and ULDPE refers to ULDPEs or VLDPEs that are manufactured by liquid phase (solution) reaction techniques. Suitable ULDPEs include ATTANE™ 4404 available from The Dow Chemical Company. Suitable VLDPEs include DFDB-9042 NT VLDPE, available from The Dow Chemical Company.

The ULDPE/VLDPE may have a density of 0.885 to 0.915 g/cc and a melt index ($I_2$) in the range of 0.1 to 30 grams/10 minutes. All individual values and subranges of from 0.885 to 0.915 g/cc and 0.1 to 30 grams/10 minutes are included and disclosed herein. For example, in some embodiments, the ULDPE/VLDPE has a density of 0.885 to 0.910 g/cc, 0.890 to 0.915 g/cc, 0.890 to 0.912 g/cc, or 0.895 to 0.905 g/cc, and a melt index of 0.1 to 25 g/10 minutes, 0.1 to 20 g/10 minutes, 0.1 to 15 g/10 minutes, 0.1 to 10 g/10 minutes, or 0.5 to 10 grams/10 minutes. Density may be measured according to ASTM D792. Melt index ($I_2$) may be measured according to ASTM D1238, condition 190° C./2.16 kg.

Exemplary ethylene/alpha-olefin elastomers for use in a cling layer are commercially available under the trade names AFFINITY™ from the Dow Chemical Company, ENGAGE™ from the Dow Chemical Company, INFUSE™ from the Dow Chemical Company, EXACT from ExxonMobil Chemical, and TAFMER™ from Mitsui Chemicals, Inc. Suitable ethylene/alpha-olefin elastomers are further described in U.S. Pat. No. 5,272,236 (Lai et al.), U.S. Pat. No. 6,486,284 (Karande et al.), and U.S. Pat. No. 6,100,341 (Friedman), which are incorporated herein by reference.

Ethylene/alpha-olefin elastomers may be produced using single-site catalysts. Methods for producing olefin polymers using single site catalysts are described in U.S. Pat. No. 5,272,236 (Lai et al.) and U.S. Pat. No. 6,486,284 (Karande et al.), the entireties of which patents are incorporated herein by reference. Single-site catalyst systems may include metallocene catalysts and post-metallocene catalysts. In exemplary embodiments, the ethylene/alpha-olefin elastomer may be produced by a metallocene catalyst or a post-metallocene catalyst.

In some embodiments, the ethylene/alpha-olefin elastomer can include one or more olefin block copolymers. Olefin block copolymers are polymers comprising two or more chemically distinct regions or segments (referred to as "blocks") that may be joined in a linear manner, that is, a polymer comprising chemically differentiated units, which are joined end-to-end with respect to polymerized ethylenic functionality, rather than in pendent or grafted fashion. The blocks may differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Suitable olefin block copolymers are further described in U.S. Pat. No. 7,608,668, which is incorporated herein by reference.

The ethylene/alpha-olefin elastomers may have a density in the range of 0.855 to 0.890 grams/cc and a melt index ($I_2$) in the range of 0.1 to 30 grams/10 minutes. All individual values and subranges of from 0.855 g/cc to 0.890 g/cc and 0.1 to 30 grams/10 minutes are included and disclosed herein. For example, in some embodiments, the ethylene/alpha-olefin elastomers may have a density of from 0.860 g/cc to 0.890 g/cc or 0.865 g/cc to 0.890 g/cc, and a melt index ($I_2$) of 0.1 to 25 g/10 minutes, 0.1 to 20 g/10 minutes, 0.1 to 15 g/10 minutes, 0.1 to 10 g/10 minutes, or 0.5 to 10 grams/10 minutes. Density may be measured according to ASTM D792. Melt index ($I_2$) may be measured according to ASTM D1238, condition 190° C./2.16 kg.

The propylene-based elastomer is a random propylene homopolymer or copolymer, a propylene/alpha-olefin copolymer, or a propylene/alpha-olefin block copolymer. In some embodiments, the propylene-based elastomer is a propylene/alpha-olefin copolymer. The propylene/alpha-olefin copolymer comprises units derived from propylene and polymeric units derived from one or more alpha-olefin comonomers. Exemplary comonomers utilized to manufacture the propylene/alpha-olefin copolymer may include C2, and C4 to C10 alpha-olefins; for example, C2, C4, C6 and C8 alpha-olefins.

The propylene-based elastomer may be made according to any suitable polymerization process, including but not limited to solution, slurry, or gas phase processes in the presence of a metallocene, constrained geometry catalyst systems, Ziegler-Natta catalysts, or bisphenyl phenol catalyst systems. Suitable methods of making propylene-based elastomer are further described in U.S. Pat. Nos. 6,960,635 and 6,525,157, incorporated herein by reference. Propylene-based elastomers are commercially available from The Dow Chemical Company, under the tradename VERSIFY™, or from ExxonMobil Chemical Company, under the tradename VISTAMAXX™ or from Mitsui Chemicals America, (Inc.,) under the tradename NOTIO™.

The propylene-based elastomer may be characterized as having substantially isotactic propylene sequences. "Substantially isotactic propylene sequences" means that the sequences have an isotactic triad (mm) measured by 13C nuclear magnetic resonance ("NMR") of greater than about 0.75; in the alternative, greater than about 0.80; in the alternative, greater than about 0.85; in the alternative, greater than about 0.90; in another alternative, greater than about 0.92; in another alternative, greater than about 0.93; in the alternative, greater than about 0.95; or in the alternative, greater than about 0.97. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by 13C NMR spectra.

The propylene-based elastomer may be characterized as having a tacticity index m/r ranging from a lower limit of 4 or 6 to an upper limit of 8 or 10 or 12. The tacticity index, expressed herein as "m/r", is determined by 13C NMR. The tacticity index m/r is calculated as defined by H. N. Cheng in MACROMOLECULES, 1984, Vol. 17, pp. 1950-1955, incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

The propylene-based elastomer may have a melt flow rate in the range of from 0.1 to 35 g/10 minutes, measured in accordance with ASTM D-1238 (at 230° C./2.16 kg). All individual values and subranges from 0.1 to 35 g/10 minutes are included herein and disclosed herein; for example, the propylene-based elastomer may have a melt flow rate in the range of from 0.1 to 30 g/10 minutes; from 0.1 to 25 g/10 minutes; from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

Multilayer Cast Films

The multilayer cast films described herein may be made using a cast film extrusion process. In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally it passes through a system of rollers and is wound onto a roll.

Embodiments of the multilayer cast films will now be further described in the following illustrative examples.

Test Methods

Density

Density can be measured in accordance with ASTM D-792.

Melt Index/Melt Flow Rate

Melt index ($I_2$) is measured in accordance with ASTM D-1238, Procedure B (condition 190° C./2.16 kg). Melt index ($I_{10}$) is measured in accordance with ASTM D-1238, Procedure B (condition 190° C./10.0 kg). Melt flow rate (MFR) is measured in accordance with ASTM D-1238, Procedure B (condition 230° C./2.16 kg).

Gel Permeation Chromatography (GPC)

The chromatographic system consisted of a PolymerChar GPC-IR (Valencia, Spain) high temperature GPC chromatograph equipped with an internal IR5 detector. The autosampler oven compartment was set at 160° Celsius and the column compartment was set at 150° Celsius. The columns used were 3 Agilent "Mixed B" 30 cm 10-micron linear mixed-bed columns and a 10-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 g/mol Mw.

The total plate count of the GPC column set was performed with Eicosane (prepared at 0.04 g in 50 milliliters of TCB (1,2,4-trichlorobenzene) and dissolved for 20 minutes with gentle agitation.) The plate count (Equation 2) and symmetry (Equation 3) were measured on a 200 microliter injection according to the following equations:

$$\text{Plate Count} = 5.54 * \left(\frac{RV_{Peak\ Max}}{\text{Peak Width at } \frac{1}{2} \text{ height}}\right)^2 \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ3)$$

where RV is the retention volume in milliliters and the peak width is in milliliters, Peak max is the maximum position of the peak, one tenth height is 1/10 height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT (butylated hydroxytoluene)) was added to a pre nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IRS detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum\limits_i IR_i}{\sum\limits_i (IR_i / M_{polyethylene_i})} \quad (EQ\ 4)$$

$$M_w = \frac{\sum\limits_i (IR_i * M_{polymethylene_i})}{\sum\limits_i IR_i} \quad (EQ\ 5)$$

$$M_z = \frac{\sum\limits_i (IR_i * M_{polymethylene_i}^2)}{\sum\limits_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$\text{Flowrate}_{effective} = \text{Flowrate}_{nominal} \times \frac{FlowMarker_{Calibration}}{FlowMarker_{Observed}} \quad (EQ7)$$

Neutron Activation Method for Metals

Two sets of duplicate samples were prepared by transferring approximately 3.5 grams of the pellets into pre-cleaned 2 dram polyethylene vials. Standards were prepared for each metal tested from their NIST traceable standard solutions (Certi. pure from SPEX) into 2-dram polyethylene vials. They were diluted using milli-Q pure water to 6 ml and the vials were heat-sealed. The samples and standards were then analyzed for these elements, using a Mark I TRIGA nuclear reactor. The reactions and experimental conditions used for these elements are summarized in the table below. The samples were transferred to un-irradiated vials before doing the gamma-spectroscopy. The elemental concentrations were calculated using CANBERRA software and standard comparative technique. Table 1 provides measurement parameters for metals determination.

TABLE 1

Reactions and experimental conditions used for elements during the NAA

| Elements | Nuclear reaction | Isotope | Half life | Reactor Power |
|---|---|---|---|---|
| Al | $^{27}$Al(n,γ)$^{28}$Al | $^{28}$Al | 2.24 m | 250 kW |
| Cl | $^{37}$Cl(n,γ)$^{38}$Cl | $^{38}$Cl | 37.2 m | 250 kW |
| Cr | $^{50}$Cr(n,γ)$^{51}$Cr | $^{51}$Cr | 27.7 d | 250 kW |
| Hf | $^{180}$Hf(n,γ)$^{181}$Hf | $^{181}$Hf | 42.4 d | 250 kW |
| Mg | $^{26}$Mg(n,γ)$^{27}$Mg | $^{27}$Mg | 9.46 m | 250 kW |
| Mo | $^{98}$Mo(n,γ)$^{99}$Mo | $^{99}$Mo | 66.0 h | 250 kW |
| Nb | $^{93}$Nb(n,γ)$^{94m}$Nb | $^{94m}$Nb | 6.26 m | 250 kW |
| Ta | $^{181}$Ta(n,γ)$^{182}$Ta | $^{182}$Ta | 114.4 d | 250 kW |
| Ti | $^{50}$Ti(n,γ)$^{51}$Ti | $^{51}$Ti | 5.76 m | 250 kW |
| W | $^{186}$W(n,γ)$^{187}$W | $^{187}$W | 23.7 h | 250 kW |
| V | $^{51}$V(n,γ)$^{52}$V | $^{52}$V | 3.75 m | 250 kW |
| Zr | $^{96}$Zr(n,γ)$^{97}$Zr | $^{97}$Zr | 16.91 h | 250 kW |

| Elements | Irradiation Time | Waiting Time | Counting Time | Gamma Energy, keV |
|---|---|---|---|---|
| Al | 2 m | 4 m | 4.5 min | 1778.5 |
| Cl | 2 m | 4 m | 4.5 min | 1642.5, 2166.5 |
| Cr | 90 m | 5 h | 1.6 h | 320 |
| Hf | 90 m | 5 h | 1.6 h | 133, 482 |
| Mg | 2 m | 4 m | 4.5 min | 843.8, 1014 |
| Mo | 90 m | 5 h | 1.6 h | 181, 739.7, 141 |
| Nb | 2 m | 4 m | 4.5 min | 871 |
| Ta | 90 m | 5 h | 1.6 h | 1121, 1222 |
| Ti | 2 m | 4 m | 4.5 min | 320 |
| W | 90 m | 5 h | 1.6 h | 135, 481 |
| V | 2 m | 4 m | 4.5 min | 1434 |
| Zr | 90 m | 5 h | 1.6 h | 743.4 |

Dynamic Mechanical Spectroscopy (DMS)

Resins were compression-molded into "3 mm thick×1 inch" circular plaques at 350° F., for five minutes, under 1500 psi pressure, in air. The sample was then taken out of the press, and placed on a counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The complex viscosity $\eta^*$, tan (δ) or tan delta, viscosity at 0.1 rad/s (V0.1), the viscosity at 100 rad/s (V100), and the viscosity ratio (V0.1/V100) are calculated from these data.

Crystallization Elution Fractionation (CEF) Method

The Crystallization Elution Fractionation (CEF) technology is conducted according to Monrabal et al, Macromol. Symp. 257, 71-79 (2007). The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 or IR-5 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for at least two hours before use. ODCB is sparged with dried nitrogen ($N_2$) for one hour before use. Dried nitrogen is obtained by passing nitrogen at <90 psig over $CaCO_3$ and 5 Å molecular sieves. ODCB is further dried by adding five grams of the dried silica to two liters of ODCB or by pumping through a column or columns packed with dried silica between 0.1 ml/min to 1.0 ml/min Eight hundred milligrams of BHT are added to two liters of ODCB if no inert gas such as $N_2$ is used in purging the sample vial. Dried ODCB with or without BHT is hereinafter referred to as "ODCB-m." A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The IR-4 or IR-5 signal data is collected at one data point/second.

The CEF column is packed with glass beads at 125 μm±6% (such as those commercially available with acid wash from MO-SCI Specialty Products) with ⅛ inch stainless tubing according to U.S. Pat. No. 8,372,931. The internal liquid volume of the CEF column is between 2.1 ml and 2.3 ml. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Comonomer Distribution Breadth Index (CDBI)

The CDBI is defined as the weight percent of the polymer molecules having a co-monomer content within 50 percent of the median total molar co-monomer content (as reported in WO 93/03093, which is incorporated herein by reference). The CDBI of polyolefins can be conveniently calculated from the short chain branching distribution (SCBD) data obtained from the techniques known in the art, such as, for example, temperature rising elution fractionation ("TREF") as described, for example, by Wild, et al., *Journal of Polymer Science*, Poly. Phys. Ed., Vol. 20, 441 (1982); L. D. Cady, "The Role of Comonomer Type and Distribution in LLDPE Product Performance," *SPE Regional Technical Conference*, Quaker Square Hilton, Akron, Ohio, 107-119 (Oct. 1-2, 1985); or in U.S. Pat. No. 4,798,081 (Hazlitt, et al.) and U.S. Pat. No. 5,008,204 (Stehling), all of which are incorporated herein by reference.

Herein, CDBI is calculated according to the following steps with the SCBD (short chain branching distribution) measured by CEF (crystallization elution fractionation):

(A) Obtain a weight fraction at each temperature (T) (wT(T)) from 20.0° C. to 119.0° C. with a temperature step increase of 0.200° C. from CEF according to the equation $\int_{20.0}^{119.9} wT(T)dT = 1.00$.

(B) Calculate the median temperature ($T_{median}$) which is at cumulative weight fraction of 0.500 (50%) including soluble fraction. The cumulative weight fraction for the entire elution temperature range (generally between 20.0 to 120.0° C.) is normalized as 1.00.

(C) Calculate the corresponding median total comonomer content in mole % ($C_{median}$) at the median temperature ($T_{median}$) by using comonomer content calibration versus elution temperature.

(D) Construct a comonomer content calibration curve by using a series of reference materials (ethylene-octene copolymers) with known amount of comonomer content, i.e., eleven reference materials with a narrow comonomer distribution (mono-modal comonomer distribution in CEF from 35.0 to 119.0° C.) with weight-average Mw (by conventional GPC) of 35,000 to 115,000 (measured via conventional GPC) at a comonomer content ranging from 0.0 mole % to 7.0 mole % are analyzed with CEF at the same experimental conditions specified in the CEF experimental sections. The comonomer content of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317, which are incorporated herein by reference.

(E) Construct comonomer content calibration by using the peak temperature ($T_p$) of each reference material and its comonomer content; The calibration of comonomer content calibration versus elution temperature is as shown below, wherein: $R^2$ is the correlation constant; T (° C.) is the elution temperature of SCBD measured by CEF.

$$\ln(1 - \text{comonomer content}) = -\frac{207.26}{273.12 + T} + 0.5533$$

$$R^{12} = 0.997$$

(F) Calculate CDBI as the total weight percentage with a comonomer content ranging from $0.5*C_{median}$ to $1.5*C_{median}$. If the density of the polymer is above 0.94, CDBI is thus defined as 100% (see WO1993003093 A1, which is incorporated herein by reference).

Ultimate Stretch

Ultimate stretch is tested on a Highlight Film Test System from Highlight Industries. The film roll is placed on the unwind section of the machine and the film is passed through a set of rollers. The film is then unwound with increasing force until it reaches its ultimate stretch point. Load cells measure the amount of force applied and a calculation is made to determine the amount of stretch present in the film, measured in percent.

On-Pallet Puncture (OPP)

This test uses a Bruceton staircase method to determine the maximum force to load at which the film can be passed over a test probe for three wraps with no failures. The test probe is inserted into the test stand at the desired protrusion distance. The film is positioned such that the test probe is aligned with the center of the film. The film is attached to the test stand and the wrapper started. Once the wrapper reaches 250% pre-stretch, the film is allowed to pass over the probe for a maximum of three wraps. Any breakage of the film during any of the wrap is considered a failure at that force to load setting. Depending on the performance of the film at the load setting (i.e. passed or failed), the force to load is adjusted up or down, and the test is repeated at the new load setting. This continues until the maximum force at which no failures occurs is found. Table 2 provides the equipment and settings used in this method.

TABLE 2

| Equipment | Lantech SHC Film Test Wrapper |
|---|---|
| Pre-stretch | 250% |
| Turntable Speed | 9 rpm |
| Force to Load (F2) | Variable |
| Probe Type | 4" by 4" blunt rod |
| Probe Protrusion Distance | 12 in |

On Pallet Tear (OPT)

This test uses a Bruceton staircase method to determine the maximum force to load at which the film can be passed over a test probe fixed with a blade to initiate a puncture. The test probe is inserted into the test stand at the desired protrusion distance. The film is positioned such that the test probe is aligned with the center of the film. The film is attached to the test stand and the wrapper started. Once the wrapper reaches 250% pre-stretch, the film is allowed to pass over the probe, for this test a single layer of film is tested. The film tension (F2 force) is increased from an initial low value of ~7 lbs in increments of 0.5 lbs until the film tears completely across the cross (CD) or transverse direction (TD). An on-pallet tear value is recorded as the highest F2 force that results in the initial puncture not propagating through the entire width of the film causing its failure. Table 3 provides the equipment and settings used in this method.

TABLE 3

| Equipment | Lantech SHC Film Test Wrapper |
|---|---|
| Pre-stretch | 250% |
| Turntable Speed | 9 rpm |
| Force to Load (F2) | Variable |
| Probe Type | 4" by 4" blunt rod fixed with a razor blade |
| Probe Protrusion Distance | 5 in |

On Pallet Load (OPL)

This test uses the Highlight Portable Film Force System. This tool utilizes a series of portable load cells that can be used in tandem or individually to understand the films ability to control the load by measuring the compressive force applied to the pallet. For this test a single load cell is attached to the stretch wrapper. The wrapper is set to 250% prestretch. The film tension (F2) is increased until the film breaks, then adjusted down by 1 lb. At this F2 the film is applied around the Highlight portable film force load cell for a total of three wraps. After the third wrap the film is cut from the stretch carriage then an integrated data collection system, supplied by Highlight, measures the force applied to the load cell. An initial value or peak load (T0) is captured then the test is continued for a selected interval and a final load data point is collected. The final load time of 30 minutes (T30) is used for this test. Table 4 provides the equipment and settings used in this method.

TABLE 4

| Equipment | Lantech SHC Film Test Wrapper |
|---|---|
| Pre-stretch | 250% |
| Turntable Speed | 17 rpm |
| Force to Load (F2) | Variable |
| Load Cell | Highlight portable film force system |
| Test Time | 30 min |

Stretch Force (SF) and Unwind Force (UF)

Both stretch force and unwind force are measured using the Highlight Stretch Film Test Stand from Highlight Industries. The Quality test is selected from the test method menu. The film is stretched to a pre-determined pre-stretch level, and for this test, 200% is used. A length of film to test is input, and for this test, 200 feet of film is tested. The Highlight test stand stretched the film to 200% and the film is allowed to reach steady state. Once the film is at a steady 200% stretch the data collection starts. Film data is collected from a series of load cells on the Highlight test stand over the 200 feet of film. The first load cell in the system measures the force required to pull the film off of the film roll, this measurement is called "unwind force". The next load cell is situated between the two rollers which are applying the target pre-stretch to the film. This load cell measures the force necessary to stretch the film to the target level. This measurement is called "stretch force". At the end of the tested footage a graph is generated and average values of unwind force, stretch force and other measurements are reported, as well as standard deviations for each measurement collected over the tested length of film. The average values are reported as Stretch Force and Unwind Force at 200% stretch.

EXAMPLES

The resins used in the multilayer cast films are shown in Tables 5A-5D.

TABLE 5A

Resin Properties

| Resin | Description | Density (g/cm³) | MI, I2 (g/10 min) | I10/I2 |
|---|---|---|---|---|
| EXCEED ™ 7518 | Metallocene ethylene-hexene copolymer | 0.918 | 7.5 | 6.2 |
| DOWLEX ™ 2035 | LLDPE | 0.919 | 6.0 | 7.2 |
| ELITE ™ 5811G | polyethylene polymer | 0.919 | 8.0 | 8.4 |
| DOWLEX ™ GM 8480F | LLDPE | 0.917 | 3.0 | 6.9 |
| Resin 1 | polyethylene composition | 0.916 | 5.2 | 6.6 |
| Resin 2 | polyethylene composition | 0.917 | 6.6 | 6.5 |
| Resin 3 | polyethylene composition | 0.915 | 5.3 | 6.6 |
| Resin 4 | polyethylene composition | 0.915 | 6.4 | 6.7 |
| Resin 5 | polyethylene composition | 0.915 | 4 | 7.0 |
| VERSIFY ™ 3401 | propylene-based elastomer | 0.895 | 8.0 | NM* |
| ELITE ™ 5230G | polyethylene polymer | 0.916 | 4.0 | 7.0 |

*NM = not measured

TABLE 5B

Resin Properties

| Resin | GPC Mn (g/mol) | GPC Mw (g/mol) | GPC Mz (g/mol) | Mw/Mn | CDBI (%) |
|---|---|---|---|---|---|
| EXCEED ™ 7518 | 24,270 | 60,920 | 112,060 | 2.51 | 69.4 |
| DOWLEX ™ 2035 | 18,210 | 66,284 | 183,183 | 3.64 | 48.5 |
| ELITE ™ 5811 | 18,670 | 84,080 | 324,530 | 4.50 | 40.9 |
| DOWLEX ™ GM 8480F | 26,414 | 88,374 | 247,696 | 3.35 | 50.2 |
| Resin 1 | 24,613 | 73,690 | 181,922 | 2.99 | 53.0 |
| Resin 2 | 22,572 | 68,869 | 164,718 | 3.05 | 52.6 |
| Resin 3 | 23,025 | 73,627 | 185,709 | 3.20 | 50.7 |
| Resin 4 | 22,128 | 69,782 | 173,572 | 3.15 | 48.2 |
| Resin 5 | 23,048 | 80,504 | 223,245 | 3.49 | 51 |
| VERSIFY ™ 3401 | NM* | NM* | NM* | NM* | NM* |
| DOWLEX ™ 5230 | NM* | NM* | NM* | NM* | NM* |

*NM = not measured

TABLE 5C

Resin Properties

| | Viscosity (Pa-s) at 190° C. | | | | Viscosity Ratio | Tan Delta |
|---|---|---|---|---|---|---|
| | 0.1 rad/s | 1 rad/s | 10 rad/s | 100 rad/s | (V100/V0.1) | 0.1 rad/s |
| EXCEED ™ 7518 | 855 | 854 | 821 | 624 | 1.37 | 179.73 |
| DOWLEX ™ 2035 | 1,318 | 1,243 | 1,005 | 591 | 2.23 | 41.16 |
| ELITE ™ 5811 | 1,484 | 1,197 | 766 | 387 | 3.83 | 10.18 |
| DOWLEX ™ GM 8480F | 2,606 | 2,411 | 1,875 | 1,004 | 2.59 | 31.16 |
| Resin 1 | 1,488 | 1,446 | 1,227 | 754 | 1.97 | 60.2 |
| Resin 2 | 1,195 | 1,171 | 1,017 | 653 | 1.83 | 81.1 |
| Resin 3 | 1,556 | 1,500 | 1,251 | 745 | 2.09 | 64.73 |
| Resin 4 | 1,219 | 1,188 | 1,014 | 634 | 1.92 | 69.13 |
| Resin 5 | 2,113 | 1,949 | 1,490 | 826 | 2.56 | 25.64 |
| VERSIFY ™ 3401 | — | — | — | — | — | — |
| DOWLEX ™ 5230 | — | — | — | — | — | — |

* NM = not measured

TABLE 5D

Resin Properties

| | Al, ppm | Mg, ppm | Ti, ppm | V, ppm | Hf, ppb | Zr, ppb | Cl, ppm |
|---|---|---|---|---|---|---|---|
| Resin 1 | 52 | 105 | 1.1 | 2.3 | ND* @ 10 | 1,100 | 73 |
| Resin 2 | 53 | 107 | 0.85 | 2.1 | ND* @ 10 | 1,100 | 68 |
| Resin 3 | 50 | 96 | 0.49 | 0.65 | ND* @ 10 | 530 | 26 |
| Resin 4 | 50 | 100 | 0.39 | 0.63 | ND* @ 10 | 420 | 26 |

*ND = not detectable at 10 ppb.

Resins 1-5

Resins 1-5 are prepared as follows: a multi-metal catalyst is prepared (Catalyst 1). Catalyst 1 is then used to prepare resins 1-5 in a solution polymerization.

Catalyst 1 Preparation

To approximately 109 kg of 0.20 M $MgCl_2$ slurry was added 7.76 kg of EADC solution (15 wt. % in heptanes), followed by agitation for 8 hours. A mixture of $TiCl_4$/$VOCl_3$ (85 mL and 146 mL, respectively) was then added, followed by a solution of $Zr(TMHD)_4$ (0.320 kg of a 0.30 M solution in Isopar E). These two additions were performed sequentially within 1 hour of each other. The resulting catalyst premix was aged with agitation for an additional 8 h prior to use.

Production of Resins 1-4

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A single reactor system is used. The continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to the reactor (solvent, monomer, comonomer, and hydrogen) is temperature controlled to maintain a single solution phase by passing the feed stream through a heat exchanger. The total fresh feed to the polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain the reactor monomer conversion at the specified targets. The cocatalyst component is fed based on calculated specified molar ratios to the primary catalyst component. Immediately following each reactor feed injection location, the feed streams are mixed with the circulating polymerization reactor contents with static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a pump.

The reactor effluent enters a zone where it is deactivated with the addition of and reaction with a suitable reagent (water) and an acid neutralization component (calcium stearate) is also added. At this same reactor exit location other additives are added for polymer stabilization (typical antioxidants suitable for stabilization during extrusion and fabrication may include IRGANOX™ 1067, IRGAFOS™ 168, and IRGANOX™ 1010).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process. The data are presented such that the complexity of the solvent recycle system is accounted for and the reaction system can be treated more simply as a once through flow diagram. The process conditions for Resins 1-2 are shown in Table 6A, for Resins 3-4 in Table 6B, and for Resin 5 in Table 7.

TABLE 6A

Process Conditions for Resin 1 and 2.

|  |  | Resin 1 | Resin 2 |
|---|---|---|---|
| Reactor Configuration | Type | Single | Single |
| Comonomer type | Type | 1-hexene | 1-hexene |
| Reactor Feed Solvent/Ethylene Mass Flow Ratio | g/g | 3.4 | 3.4 |
| Reactor Feed Comonomer/Ethylene Mass Flow Ratio | g/g | 0.59 | 0.58 |
| Reactor Feed Hydrogen/Ethylene Mass Flow Ratio | g/g | 1.43E−04 | 1.63E−04 |
| Reactor Temperature | ° C. | 192 | 192 |
| Reactor Pressure | barg | 50.0 | 50.0 |
| Reactor Ethylene Conversion | % | 92.4 | 92.4 |
| Reactor Catalyst Type | Type | Catalyst 1 | Catalyst 1 |

TABLE 6A-continued

Process Conditions for Resin 1 and 2.

|  |  | Resin 1 | Resin 2 |
|---|---|---|---|
| Reactor Co-Catalyst 1 Type | Type | Triethyl-aluminum | Triethyl-aluminum |
| Reactor Co-Catalyst 1 to Catalyst Molar Ratio (Al to Ti ratio) | mol/mol | 11.0 | 11.0 |
| Reactor Residence Time | min | 5.3 | 5.3 |

TABLE 6B

Process Conditions for Resin 3 and 4.

|  |  | Resin 3 | Resin 4 |
|---|---|---|---|
| Reactor Configuration | Type | Single | Single |
| Comonomer type | Type | 1-octene | 1-octene |
| Reactor Feed Solvent/Ethylene Mass Flow Ratio | g/g | 1.5 | 1.4 |
| Reactor Feed Comonomer/Ethylene Mass Flow Ratio | g/g | 0.761 | 0.818 |
| Reactor Feed Hydrogen/Ethylene Mass Flow Ratio | g/g | 1.7E−04 | 1.9E−04 |
| Reactor Temperature | ° C. | 192 | 192 |
| Reactor Pressure | barg | 50 | 50 |
| Reactor Ethylene Conversion | % | 92.4 | 92.2 |
| Reactor Catalyst Type | Type | Catalyst 1 | Catalyst 1 |
| Reactor Co-Catalyst 1 Type | Type | Triethyl-aluminum | Triethyl-aluminum |
| Reactor Co-Catalyst 1 to Catalyst Molar Ratio (Al to Ti ratio) | mol/mol | 12.0 | 12.0 |
| Reactor Residence Time | min | 8.7 | 8.9 |

Resin 5

A heterogeneously branched ethylene/α-olefin copolymer is prepared using a multi-constituent catalyst system, as described hereinabove, suitable for (co)polymerizing ethylene and one or more α-olefin comonomers, e.g. 1-octene or 1-hexene, in an adiabatic continuously stirred tank reactor, CSTR, under a solution phase polymerization condition. More specifically for this example the reactor consists of two adiabatic reactors linked together in series, operating under a solution phase polymerization condition. All feed streams are introduced into the first reactor which is a mechanically agitated adiabatic CSTR. The effluent from the first reactor is fed to the second reactor which is identical to the first except that it is not mechanically agitated and the second reactor accepts no feeds other than the effluent from the first reactor.

The solvent, e.g. Isopar E, ethylene monomer, and 1-octene or 1-hexene comonomer reactor feed streams are purified using molecular sieves prior to introduction in the reaction environment. The solvent, ethylene monomer, and 1-octene or 1-hexene comonomer are combined into a single feed stream prior to introduction into the reaction environment and are temperature controlled. The hydrogen is also added to the combined single feed stream prior to introduction into the reaction environment.

The catalyst system is fed to the reaction environment separately from the single feed stream. The catalyst-premix (Catalyst 1) is combined in line to the reactor with a dilute stream of tri-ethyl aluminum, TEA. The TEA flow is controlled to achieve a specified molar ratio of Al to Ti with the catalyst premix. The catalyst-premix is flow controlled to control the extent of reaction in the reaction environment. Specific targets are contained in data Table 7.

The first reactor temperature and the overall ethylene conversion are controlled by adjusting the catalyst-premix flow and the total solvent flow introduced into the reaction environment. Melt index of the overall polymer is controlled by adjusting the hydrogen feed to the reaction environment. Density of the overall polymer is controlled by adjusting the comonomer feed to the reaction environment. Values for the control parameters are contained in data Table 5.

After leaving the reaction environment, reaction is stopped by addition of and reaction of the active catalyst with a fluid specially designed for that purpose, typically water. The polymer is separated from the solvent and any unreacted monomer, comonomer(s), and hydrogen; the isolated polymer melt is then pelletized and packaged. The separated stream containing solvent, monomer, comonomer(s), and hydrogen is recycled after removal of a purge stream.

TABLE 7

Process Conditions for Resin 5.

| Description | Units | Value |
| --- | --- | --- |
| Product | Name | Resin 5 |
| Reactor Feed (Solvent Mass Flow/ Ethylene Mass Flow) | g/g | 5.35 |
| Reactor Feed (Comonomer Mass Flow/ Ethylene Mass Flow) | g/g | 0.61 |
| Reactor Feed (Fresh Hydrogen Mass Flow/ Ethylene Mass Flow) | g/g | 4.86E−05 |
| Reactor Feed Temperature | °C. | 15.0 |
| Reactor 1 Temperature | °C. | 185.0 |
| Reactor 2 Temperature | °C. | 207.3 |
| Overall Ethylene Conversion | wt. % | 92.5 |
| Al:Ti molar ratio | mole/mole | 13.0 |
| Comonomer | Type | 1-Hexene |

Multilayer Cast Films

The multilayer cast films were prepared as outlined below in Table 8 as follows: All of the films produced in this study were fabricated on a 5 layer Egan Davis Standard coextrusion cast film line. The cast line consists of three 2½" and two 2" 30:1 L/D Egan Davis Standard MAC extruders which are air cooled. All extruders have moderate work DSB (Davis Standard Barrier) type screws. A microprocessor monitors and controls operations. The extrusion process is monitored by pressure transducers located before and after the breaker plate as well as four heater zones on each barrel, one each at the adapter and the block and two zones on the die. The microprocessor also tracks the extruder RPM (revolutions per minute), % FLA (full load amps), HP (horsepower), rate, line speed, % draw, primary and secondary chill roll temperatures, gauge deviation, layer ratio, rate/RPM, and melt temperature for each extruder.

Equipment specifications include a Cloeren 5 layer dual plane feed block and a Cloeren 36" Epoch III autogage 5.1 die. The primary chill roll has a matte finish and is 40" O.D. (outer diameter)×40" long with a 30-40 RMS (root mean square) surface finish for improved release characteristics. The secondary chill roll is 20" O.D.×40" long with a 2-4 RMS surface for improved web tracking. Both the primary and secondary chill roll has chilled water circulating through it to provide quenching. There is an X-ray gauge sensor from Scantech for gauge thickness and automatic gauge control if needed. Rate is measured by five Barron weigh hoppers with load cells on each hopper for gravimetric control. Samples are finished on the two position single turret Horizon winder on 3" I.D. cores with center wind automatic roll changeover and slitter station. The maximum throughput rate for the line is 600 pounds per hour and maximum line speed is 1200 feet per minute. Table 8 shows the multilayer cast film formulations produced.

TABLE 8

Multilayer Cast Film Formulations

| | Cling Layer 10% of Overall Film Structure | Core Layer 80% of Overall Film Structure | Release Layer 10% of Overall Film Structure |
| --- | --- | --- | --- |
| Comp. Film 1 | 95 wt. % EXCEED ™ 7518 + 5 wt. % VERSIFY ™ 3401 | 100 wt. % DOWLEX ™ 5230 | 100 wt. % EXCEED ™ 7518 |
| Comp. Film 2 | 95 wt. % DOWLEX ™ 2035 + 5 wt. % VERSIFY ™ 3401 | 100 wt. % DOWLEX ™ 5230 | 100 wt. % DOWLEX ™ 2035 |
| Comp. Film 3 | 95 wt. % ELITE ™ 5811 + 5 wt. % VERSIFY ™ 3401 | 100 wt. % DOWLEX ™ 5230 | 100 wt. % ELITE ™ 5811 |
| Comp. Film 4 | 95 wt. % DOWLEX ™ GM 8480F + 5 wt. % VERSIFY ™ 3401 | 100 wt. % DOWLEX ™ 5230 | 100 wt. % DOWLEX ™ GM 8480F |
| Comp. Film 5 | 95 wt. % Resin 5 + 5 wt. % VERSIFY ™ 3401 | 100 wt. % DOWLEX ™ 5230 | 100 wt. % Resin 5 |
| Inv. Film 6 | 95 wt. % Resin 1 + 5 wt. % VERSIFY ™ 3401 | 100 wt. % DOWLEX ™ 5230 | 100 wt. % Resin 1 |
| Inv. Film 7 | 95 wt. % Resin 2 + 5 wt. % VERSIFY ™ 3401 | 100 wt. % DOWLEX ™ 5230 | 100 wt. % Resin 2 |
| Inv. Film 8 | 95 wt. % Resin 3 + 5 wt. % VERSIFY ™ 3401 | 100 wt. % DOWLEX ™ 5230 | 100 wt. % Resin 3 |
| Inv. Film 9 | 95 wt. % Resin 4 + 5 wt. % VERSIFY ™ 3401 | 100 wt. % DOWLEX ™ 5230 | 100 wt. % Resin 4 |

TABLE 9

| | Ultimate Stretch (%) | Stretch Force @ 200% lbs) | Unwind Force @ 200% (lbs) | On Pallet Puncture (lbs) | On Pallet Tear (lbs) | On Pallet Load @ T0 (lbs) | On Pallet Load @ T30 min. (lbs) |
|---|---|---|---|---|---|---|---|
| Comp. Film 1 | 344 | 37.1 | 8.8 | 9.0 | 7.7 | 32.4 | 28.1 |
| Comp. Film 2 | 370 | 36.3 | 10.2 | 8.0 | 7.5 | 35.0 | 27.2 |
| Comp. Film 3 | 387 | 41.0 | 6.6 | 8.0 | 6.0 | 29.9 | 22.2 |
| Comp. Film 4 | 295 | 38.0 | 10.0 | 8.0 | 8.7 | 35.7 | 28.5 |
| Comp. Film 5 | 336 | 37.0 | 11.0 | 9.0 | 8.5 | 35.3 | 28.3 |
| Inv. Film 6 | 347 | 35.5 | 10.7 | 10.0 | 8.5 | 35.5 | 27.6 |
| Inv. Film 7 | 369 | 35.4 | 10.1 | 9.8 | 7.5 | 36.3 | 27.4 |
| Inv. Film 8 | 355 | 35.0 | 10.9 | 9.7 | 7.2 | 33.9 | 26.2 |
| Inv. Film 9 | 360 | 34.6 | 11.3 | 10.2 | 7.5 | 35.1 | 26.3 |

As shown in Table 9, the inventive films exhibit a better overall combination of desirable film properties, where an improvement is seen in, for example, on pallet puncture, while other film properties, for example, ultimate stretch, are not adversely affected. In addition, the inventive films use resins in the cling and release layers that exhibit better flow properties, as shown in Table 5C, such as, for larger dies.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A multilayer cast film having a cling layer and a release layer, wherein:
    the cling layer comprises:
    (i) a first polyethylene composition which comprises the reaction product of ethylene and, optionally, one or more alpha olefin comonomers, wherein the first polyethylene composition is characterized by the following properties:
        (a) a melt index, $I_2$, of greater than 5.1 to 12.0 g/10 min;
        (b) a density of 0.905 to 0.920 g/cc;
        (c) a melt flow ratio, $I_{10}/I_2$, of 6.0 to 7.6; and
        (d) a molecular weight distribution, (Mw/Mn) of from 2.6 to 3.5; and
        (e) a viscosity of 0.1 rad/s at 190° C. of 1,000 Pa·s to 2,000 Pa·s and
    (ii) a polymer selected from ultra-low density polyethylene, very low density polyethylene, ethylene/alpha-olefin elastomer, propylene-based elastomer, or combinations thereof; and
    the release layer comprises a second polyethylene composition which comprises the reaction product of ethylene and, optionally, one or more alpha olefin comonomers, wherein the second polyethylene composition is characterized by the following properties:
        (a) a melt index, $I_2$, of greater than 5.1 to 12.0 g/10 min;
        (b) a density of 0.905 to 0.920 g/cc;
        (c) a melt flow ratio, $I_{10}/I_2$, of 6.0 to 7.6; and
        (d) a molecular weight distribution, (Mw/Mn) of from 2.6 to 4.0; and
        (e) a viscosity of 0.1 rad/s at 190° C. of 1,000 Pa·s to 2,000 Pa·s.

2. The multilayer cast film of claim 1, wherein the release layer further comprises a low density polyethylene having a 0.910 to 0.930 g/cc and a melt index of 0.5 to 4.0 g/10 min.

3. The multilayer cast film of claim 1, wherein the first polyethylene composition and the second polyethylene composition is formed in the presence of a catalyst composition comprising a multi-metallic procatalyst via solution polymerization.

4. The multilayer cast film of claim 1, wherein the first polyethylene composition and the second polyethylene composition have a composition distribution breadth index, CDBI, of 40% to 60%.

5. The multilayer cast film of claim 1, wherein the first polyethylene composition and the second polyethylene composition have a viscosity ratio (V0.1/V100) of 1.5 to 2.2, where V0.1 is the viscosity at 0.1 rad/s and 190° C., and V100 is the viscosity at 100 rad/s and 190° C.

6. The multilayer cast film of claim 1, wherein the cling layer comprises 50 wt. % to 99 wt. % of the first polyethylene composition.

7. The multilayer cast film of claim 1, wherein the release layer comprises 60 wt. % to 100 wt. % of the second polyethylene composition.

* * * * *